May 8, 1962    F. C. BERSWORTH ET AL    3,033,214
RECOVERY AND REUSE OF COMPLEXING AGENTS FROM SPENT SOLUTIONS
Filed Jan. 20, 1955
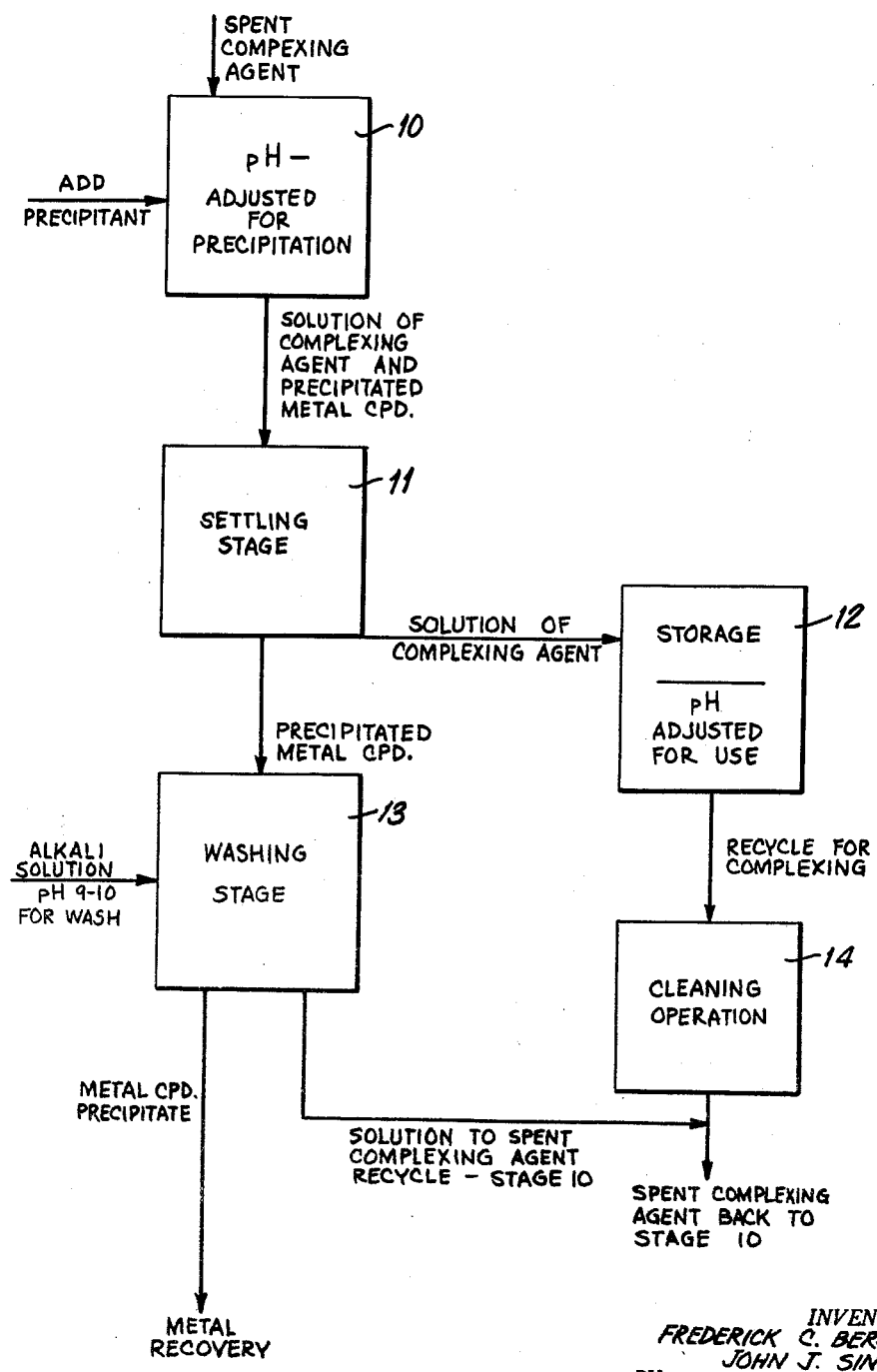
INVENTORS
FREDERICK C. BERSWORTH
JOHN J. SINGER, JR.
BY Darby & Darby
ATTORNEYS

3,033,214
RECOVERY AND REUSE OF COMPLEXING AGENTS FROM SPENT SOLUTIONS

Frederick C. Bersworth, Summit, N.J., and John J. Singer, Jr., Westboro, Mass., assignors to The Dow Chemical Company, Midland, Mich., a corporation of Delaware Filed Jan. 20, 1955, Ser. No. 482,965
4 Claims. (Cl. 134—13)

This invention relates to a method of recovering complexing agents from solutions containing those agents substantially fully saturated with metals and in particular, is concerned with the recovery of aminocarboxylic acid type complexing agents.

The utilization of complexing agents of the amino carboxylic acid type is practiced on a substantial scale in many industrial operations, because through their capacity to form substantially un-ionized chelates with metal ions, these agents render the metal ions insensitive to the usual precipitation reactions and thus remove them from the sphere of reaction in the medium in which they are complexed. Water softening in industrial dyeing and laundering operations is a typical application, because calcium and iron which contaminate the water being used are effectively sequestered and thereby the efficiency of the overall operation is improved. In other processees, for example, evaporation of sugar solutions in refineries, it is common experience that within a period of a few days after the commencement of the run the accumulation of scale on evaporator surfaces becomes so appreciable that the efficiency of the operation is reduced and an overall throughput of sugar solution must be diminished. Ultimately a shut-down is necessary in order to clean the evaporator surfaces.

In general, any heat transfer surface at which a solution is being heated will accumulate scale, which is formed largely of calcium salts, and possibly some iron. It can be dissolved and removed from the surface by means of complexing agents which extract the calcium or iron from the insoluble scale, loosen it and even ultimately completely dissolve it. However, in any large installation this involves the utilization of very large quantities of the complexing agent and, because the complexing agents are relatively expensive, economics frequently dictates the tolerance of limited amounts of scale in preference to its removal with complexing agents. It is, accordingly, a fundamental object of this invention to provide a means of recovering useful complexing agents from a spent solution thereof so that a cyclic operation of circulating complex agent through a system to cleanse the scale may be practiced with substantial recovery of the complexing agent so that a reuse of a large fraction thereof will render the employment of complexing agent for such purposes economically feasible.

It is another object of the invention to provide a method of recovering metals from solutions of complexing agents so that metal values in relatively insoluble materials can be recovered first by extraction thereof with the complexing agent and subsequently by recovery of the metal and agent from the solution.

It is another object of the invention to provide a process in which metals are sequestered by the complexing agent and are rendered subject to precipitation by alteration of the conditions in the aqueous medium containing chelated metal.

Other objects and advantages of the invention will in part be obvious and in part appear hereinafter.

The invention, accordingly, is involved in a process for the recovery of spent solutions of chelating agents containing metal in chelated form wherein the solution is adjusted to a recovery pH, e.g. strongly acid in the range of 4 to 5 or lower or strongly alkaline, in the range 10 to 12, in the presence of an anion which at the said recovery pH forms a highly insoluble compound with the sequestered metal, thereby to induce precipitation of the metal in combination with the anion, separating the precipitated metal compound and the supernatant solution of sequestering agent and, thereafter, neutralizing or adjusting the pH of the sequestering agent solution to its optimum useful range and circulating it in the medium where the sequestering agent is required to function as such. As a step in improving the efficiency of the process, the precipitated sludge is washed with alkali solution to recover such additional sequestering agent values as may have been occluded therein and this solution is returned to the spent sequestering agent solution prior to the next regeneration. Amino carboxylic acid sequestering agents susceptible to this kind of recovery operation are those which correspond to the following general formula:

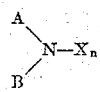

wherein X is selected from the group consisting of H, —CH$_2$COOM, —CH$_2$CH$_2$OH, —CH$_2$CH$_2$COOM, M being an alkali metal, such as sodium, potassium, lithium, or ammonium base,

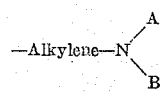

wherein Alkylene is a low molecular weight bivalent alkyl group which places 2–3 carbon atoms between the nitrogens, such as, ethylene, propylene, isopropylene, cyclohexylene; A and B are selected from the group consisting of H, —CH$_2$COOM, —CH$_2$CH$_2$OH but A and B need not be the same and not more than one of A, B, or X is hydrogen; $n$ has a value of 1, 2, 3, 4 or more.

In the FIGURE I the flow diagram illustrates the sequence of steps characterizing the invention.

Typical compounds coming within the scope of the formula and which are susceptible to this recovery process are glycine, diglycine, triglycine, nitrilotriacetic acid, triethanolamine, ethylenediaminetetraacetic acid, monoethanolethylenediaminetriacetic acid, diethanolethylenediaminediacetic acid and polymers of the ethylene diamine, containing hydroxy alkyl and carboxymethyl groups on the amino hydrogen positions. Compounds of this type are those derived from diethylenetriamine, triethylene tetramine, tetraethylene pentamine. For certain relatively costly metals, the chelating agents may be used to extract them from ores and the metal recovered in accordance with this process.

Of the various metals which can be removed from the chelated structure through precipitation reactions, there are calcium and magnesium which form boiler and evaporator surface scale; beyond these there are a variety of metals such as lead, copper, nickel, cobalt and iron, and many others, all of which are subject to partially quantitative recovery through a judicious use of precipitation reactions. The compositions which can be regenerated may include only a single one of the complexing agents or a combination of two or more.

Thus, as a general proposition, lead, copper, nickel, cobalt and iron form extremely insoluble sulfides and solutions of these metals, wherever they exist in complex form, can be adjusted to a pH such that the conditions will reasonably lead to precipitation of the sulfide with decomposition of the chelate. Sodium sulfide or hydrogen sulfide may be added to the alkaline solution of the complex and, because the solution is alkaline, the concentration of sulfide ion may reach high values. Because of the competition between the organic complexing agent and the sulfide anion quantities of the sulfide are added to effect substantially complete precipitation of the metal as sulfide. Then, following this, removal of the metal sulfide is a mechanical problem. However, since the solution will contain excess sulfide it must be removed and this is accomplished by acidifying the solution, thereby to convert the sodium sulfide to hydrogen sulfide which may be boiled off or removed by bubbling air through the solution. The pH of the solution then may be raised to the alkaline range for further use. Also, the solution pH may be further decreased to about 2, or lower, so as to precipitate the acid form of the chelating agent. This operation would be a desirable one occasionally, because the accumulation of alkali sulfate in the solution of the chelating agent would reduce its usefulness and an occasional application of this technique would be desirable.

The precipitation of the complexing agent in its acid form is possible only when the particular amino acid is insoluble in water. When this is not the case an ion exchange column can be used to absorb and retain amino acid, which can be subsequently removed from the column by eluting with ammonia.

Those metals which do not form sufficiently insoluble sulfides may be removed from the solution by altering pH to a level so that the strength with which the metal is held in complex form is reduced considerably and other precipitating agents may then be added to precipitate the metal; for example, oxalate, phosphate, sulfate, fluoride and the like. This operation is suitable for calcium, barium, strontium, magnesium, zinc, aluminum and other metals giving similar precipitation reactions. Here again, following removal of the metal by precipitation complete recovery of the solution requires removal of the ordinary precipitating agent as well as any sulfide which might have been used to remove copper, nickel, lead, iron and cobalt. Acidification and boiling would remove most of the hydrogen sulfide. The separation from other precipitating agents, which accumulate to a level requiring it after 4 or 5 regeneration cycles, may be accomplished either by precipitation of free amino acid in strongly acidified solution or by absorption on an anion exchange column.

Where specific combinations of amino complexing agents are used for complexing substantial quantities of iron, such as mixtures of glycine and ethylenediaminetetraacetic acid or the mono- or di-ethanol derivatives of ethylenediamine tri- or di-acetic acid, the regeneration can be accomplished either by using sulfide precipitation or by adjusting the pH of the solution in the presence of a suitable precipitant to accomplish decomposition of the chelate and precipitation of the metal. For example, the efficiency of these chelating agents for retaining iron in solution is reduced as the pH is increased. Hence, if one of these iron complexing agents is saturated with iron at pH 7, iron will usually precipitate as hydroxide if the pH is raised to about 12 or higher. If the iron is then removed by filtration, or settling, much of the efficiency of the original chelating agent is regained when its pH is reduced to 7 again. This operation, of course, is most useful only if iron is the principal metal to be handled. Where other metals are present it is necessary to accomplish their separation as well.

The following specific descriptions of recovery operations will illustrate the principles involved in the application of this invention:

*Example 1*

A solution of ethylenediaminetetraacetic acid sodium salt of 5 percent concentration is circulated through an evaporator having a heavy accumulation of scale until complete cleaning of the evaporator surface is effected. Of course, the volume of the solution must be sufficient to dissolve all of the scale, and this will depend upon the size of the evaporator. The bulk of the metal taken up in such conditions is calcium and regeneration of the solution is accomplished by acidifying it to a pH of 4, using sulfuric acid. At this pH much of the calcium will precipitate as calcium sulfate but some will remain in the solution.

If a more complete regeneration of the solution is required, either sodium oxalate, oxalic acid or sulfate may be added to the spent solution in about 100 percent molar excess of the amount of calcium present. This is usually necessary only at the first regeneration of the fresh solution or of recently neutralized acid.

With the concentration of sulfate in the solution at a level suitable for precipitation and pH of the solution reduced to 4, about 90 percent of the calcium complexed in the solution is precipitated and can be removed by permitting the solid to settle and decanting the acidified aqueous solution. This recovered solution is removed to a storage tank, the pH is raised to about 10 or 11 by the addition of solid sodium hydroxide, and thereupon, it is ready for use in a recycle operation.

The recovery of 90 percent of the complexing agent in this stage is attributable to the fact that a substantial part of the loss occurs as occluded matter in the precipitate itself. Indications are that some of the complexing agent carried in the solid phase is present as an insoluble calcium salt of the chelate. If the precipitate is mixed with water and alkali approximately to a pH of about 9, a substantial fraction of the chelating agent therein is brought into the solution as the disodium calcium chelate.

To minimize loss in regeneration this alkaline wash solution from the precipitate is then evaporated to a concentration of 3 to 4 percent of complexing agent and this solution is stored until the next cycle of regeneration.

Thereafter, when the recovered major proportion of the complexing agent solution has been used a second time in cleaning operations, the complexing agent takes the form principally of the calcium chelate and is then mixed with the solution which was recovered from the preceding precipitate and the regeneration operation then repeated. In the following regeneration, acidification with sulfuric acid to a pH of about 4 will produce adequate precipitation for the addition of sulfuric acid represents only the stoichiometric amount which is removed from the cleaning medium when the calcium is precipitated. The excess which was initially added in the first operation remains in solution and is necessary only to replace that sulfate loss in the precipitation reaction. Hence, when the complexing solution which is spent in one of the repeat cycles after recovery is mixed with the calcium chelate solution recovered from the calcium precipitate of a preceding cycle, the sulfuric acid is added to the solution to lower the pH to 4.

Other precipitants for calcium, such as oxalate, may be used, but their cost is too high.

In large scale operations utilizing the complexing agent to clean the scale from boiler surfaces, it is found economically feasible to take some pains to recover the complexing agent. In fact, that which makes the cleaning with complexing agents feasible is the possibility of reclaiming the sequestering agent from the spent solution and reclaiming a portion from the precipitate. It is effective separation of the sequestering agent from the precipitate which enhances the economic feasibility of the regeneration process.

In fact, where the operation is carried out without utilizing the extract from the precipitate, it would be found that after six regenerations of the complexing agent solution about 85 percent of the initial charge of sequestering agent would be lost. If, however, the process is carried out as described, with reclamation of complexing agent from the precipitate, it will be found after six regenerations that substantially all of the initial sequestering agent will still be on hand. Loss is due almost entirely to mechanical handling or techniques.

Generally, after many regenerations of the solution, it will be desirable or even necessary to purify the sequestering agent solution in order to separate it from the medium which by this time will have accumulated a substantial amount of sodium sulfate.

This recovery of the free sequestering acid is carried out by reducing the pH of the solution to about 1–2 with sulfuric acid after calcium has been removed in the reclamation cycle described. Following this acidification, the crystalline sequestering acid will separate and can easily be removed from the medium by filtration. Of the sequestering agents mentioned, triglycine and ethylenediaminetetraacetic acid are easily precipitated by acidification. Others containing hydroxy alkyl solubilizing groups should be purified by ion exchange. The crystalline acid form of sequestering agent can be brought back into solution in useful form for further sequestering and cleaning operations by utilization of caustic alkali solutions adjusted to a pH of 9–12.

In general for scale removing and cleaning operations it is found most advantageous to operate with the sequestering agent solution at concentration of about 5 percent by weight. Despite the fact that many manipulations are involved in this recovery operation, careful acidification and precipitation of materials can be carried out so that the efficiency of the regeneration can be kept at about 95 percent recovery.

Reference to the flow chart forming the drawing accompanying the specification generalizes the operation by illustrating that in stage 10 spent complexing agent is acidified to a pH of about 4 in the presence of a precipitating agent to bring about precipitation of the complexed metal and the solution then passes to a settling stage or tank 11. Separation of solids is accomplished and the acidification solution is passed to a storage stage 12, where it is adjusted to proper pH for reuse and then passes on to reuse for cleansing stage 14, following which it becomes again a spent complexing agent solution ready to be passed to a regeneration cycle. In the meantime, the sludge separated from the settling tank is washed and neutralized in stage 13 with a sodium hydroxide solution of pH about 9 or 10 and the clear filtrate containing some recovered complexing agent as calcium chelate is returned to the recycle operation with the spent sequestering agent.

In the cleansing operation, using chelating agents of the type described, they are found to be most effective when their concentration is in the range of 3 to 10 percent, by weight, generally about 5 percent, and the pH greater than 10.5.

The recovery operation described has been referred specifically to a solution of ethylenediaminetetraacetic acid, which, of course, would be formed of the sodium salt in the alkaline range. The process is similarly applicable to glycine, diglycine, triglycine, ethylenediaminetetraacetic acid, monoethanolethylenediaminetriacetic acid, diethanolethylenediaminediacetic acid, and various mixtures of these compositions useful as sequestering agents. In some instances the sequestering agent itself is used in admixtures with triethanolamine and again reclamation of the sequestering value follows the same technique.

*Example 2*

A mixture of ethylenediaminetetraacetic acid and ethanolethylenediaminetriacetic acid, in substantially equimolar amounts has the adventage that it is effective to chelate iron at alkaline pH's. Used at concentrations of 3 to 15 percent, it is effective to remove scale from heat transfer surfaces and solutions can be regenerated in the same fashion as described in Example 1.

Mixtures of this type with diethanolethylenediamine diacetic acid are also effective to dissolve scale and can be regenerated in the same fashion as described in Example 1.

*Example 3*

A solution of diethanolaminoacetic acid of 3 to 10 percent concentration is useful to remove scale which has unusually high content of iron. Alone or admixed with other agents of the class described it can be regenerated by following the process set forth in detail in Example 1.

The regeneration operation is based upon the observation that although normally a chelating agent is useful to prevent the usual ionic reactions of a given metal, the effect is strongest only in a specific range of pH, usually around 7, i.e., 5 to 8 or 9. Hence, since efficiency of chelation falls off outside that range, stability of the chelate itself is diminished and the creation of conditions which are the reverse of chelation becomes possible. Thus, where the chelated metal forms sulfides which are highly insoluble, alkalization of a solution of the metal chelates to a range beyond the most stable level for that metal chelate produce conditions suitable for precipitation of the metal. Similarly, acidification to a strongly acid pH is even made possible, because, certain amino acid chelating agents are relatively insoluble at low pH and chelates of amino acids generally are least stable as that range is approached. In summary the following partial tabulation is made:

| Metal | Preferred pH Range for precipitation | Precipitant |
| --- | --- | --- |
| Calcium | 4 to 5 | Sulfate. Oxalate. |
| Barium | 4 to 5 | Sulfate. |
| Lead | | Sulfide. |
| Copper | | Do. |
| Cobalt | 9 to 10; (above 9, generally higher pH preferred). | Do. |
| Nickel | | Do. |
| Iron | | Do. |
| Iron | 9 to 10–12 | Hydroxide. |

What is claimed is:
1. In a process of maintaining heat transfer surfaces free from scale characterized by its containing calcium compounds, which comprises circulating a solution of an amino carboxylic acid chelating agent over said surface until the scale is substantially disintegrated in a cleaning cycle, the improvement which comprises circulating said spent chelating agent solution into a regeneration cycle wherein the spent solution is adjusted to a precipitation pH of about 5 in the presence of an anion which forms an insoluble calcium compound at the adjusted pH, separating the calcium salt precipitate therefrom, thereby recovering the supernatant liquid containing free chelating agent, extracting said calcium compound precipitate with an aqueous alkaline solution and adding said solution to said recovered supernatant liquid, adjusting the pH of said combined recovered solution to an effective chelating range and recirculating it to the said cleaning cycle and heat transfer surface.

2. The method in accordance with claim 1 in which the chelating agent is ethylenediaminetetraacetic acid.

3. The method in accordance with claim 1 in which the chelating agent is ethylenediaminetetraacetic acid and regeneration is based upon recovery of said solution from its calcium chelate wherein precipitating pH is about 5 and the precipitating agent is the oxalate anion.

4. The method in accordance with claim 1 in which the precipitating pH is about 12.

References Cited in the file of this patent

UNITED STATES PATENTS

| | | |
| --- | --- | --- |
| 2,407,645 | Bersworth | Sept. 17, 1946 |
| 2,556,128 | Webb | June 5, 1951 |
| 2,694,657 | Brundin | Nov. 16, 1954 |
| 2,700,004 | Miller | Jan. 18, 1955 |
| 2,774,694 | Wiggins | Dec. 18, 1956 |

OTHER REFERENCES

Zussman: Am. Dyestuff Reporter, vol. 38, pages 500–501 (1949), "Versene" Technical Bulletin No. 1, Bersworth Chem. Co., pages 1, 3, 5, 7, 11, 13 and 14 (1949).